(12) United States Patent
Koshigaya

(10) Patent No.: US 9,202,153 B2
(45) Date of Patent: Dec. 1, 2015

(54) INFORMATION PROCESSING APPARATUS, PRINTING SYSTEM, ERROR NOTIFICATION METHOD, AND STORAGE MEDIUM STORING PROGRAM THEREOF

(71) Applicant: CANON KABUSHIKI KAISHA, Tokyo (JP)

(72) Inventor: Motoki Koshigaya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 13/781,652

(22) Filed: Feb. 28, 2013

(65) Prior Publication Data

US 2013/0242336 A1    Sep. 19, 2013

(30) Foreign Application Priority Data

Mar. 15, 2012   (JP) .................................. 2012-059102

(51) Int. Cl.
*G06K 15/00* (2006.01)
*G06F 3/12* (2006.01)

(52) U.S. Cl.
CPC ............ *G06K 15/408* (2013.01); *G06F 3/1207* (2013.01); *G06F 3/1259* (2013.01); *G06F 3/1288* (2013.01); *G06F 3/1292* (2013.01); *G06F 3/122* (2013.01); *G06F 3/1204* (2013.01); *G06F 3/1228* (2013.01)

(58) Field of Classification Search
None
See application file for complete search history.

(56) References Cited

U.S. PATENT DOCUMENTS

| 5,878,302 A * | 3/1999 | Inui et al. ......................... 399/81 |
| 7,284,044 B2 * | 10/2007 | Teraoaka et al. ............. 709/221 |
| 7,474,423 B2 * | 1/2009 | Garcia et al. ................. 358/1.15 |
| 8,065,436 B2 * | 11/2011 | Asthana et al. ............... 709/245 |
| 8,179,549 B1 * | 5/2012 | Evans ......................... 358/1.15 |
| 8,254,538 B1 * | 8/2012 | Watts et al. ............. 379/100.01 |
| 8,526,021 B2 * | 9/2013 | Takahashi ................... 358/1.13 |
| 2002/0059362 A1 * | 5/2002 | Maeda ......................... 709/203 |
| 2002/0097262 A1 * | 7/2002 | Iwase et al. .................... 345/744 |
| 2002/0114004 A1 * | 8/2002 | Ferlitsch ...................... 358/1.15 |
| 2002/0191210 A1 * | 12/2002 | Staas et al. ................... 358/1.15 |
| 2003/0007172 A1 * | 1/2003 | Takayanagi .................. 358/1.15 |
| 2003/0174347 A1 * | 9/2003 | Gonzalez et al. .............. 358/1.6 |
| 2004/0136736 A1 * | 7/2004 | Inaba .............................. 399/38 |
| 2004/0137919 A1 * | 7/2004 | Biundo ......................... 455/466 |
| 2004/0165209 A1 * | 8/2004 | Aoki et al. .................... 358/1.14 |
| 2004/0218213 A1 * | 11/2004 | Shimizu et al. .............. 358/1.15 |

(Continued)

FOREIGN PATENT DOCUMENTS

| JP | 2001-312392 A | 11/2001 |
| JP | 2004-220606 A | 8/2004 |

OTHER PUBLICATIONS

David Kappos, Subject Matter Eligibility of Computer Readable Media, US Patent and Trademark Office, Feb. 23, 2010, 1351 OG 212.*

(Continued)

*Primary Examiner* — Ted Barnes
(74) *Attorney, Agent, or Firm* — Fitzpatrick, Cella, Harper & Scinto

(57) ABSTRACT

An email requesting an attached file to be printed is received from an email server. In the case where printing of the attached file of the received email has not been completed, an error notification indicating that the printing has not been completed is sent to the email server as a reply to the received email.

23 Claims, 18 Drawing Sheets

(56) References Cited

U.S. PATENT DOCUMENTS

| | | | |
|---|---|---|---|
| 2005/0021647 A1* | 1/2005 | Maeda | 709/206 |
| 2005/0094193 A1* | 5/2005 | Oswald | 358/1.15 |
| 2005/0134893 A1* | 6/2005 | Han | 358/1.14 |
| 2005/0183141 A1* | 8/2005 | Sawada | 726/16 |
| 2005/0185993 A1* | 8/2005 | Kobayashi | 399/309 |
| 2005/0270569 A1* | 12/2005 | Hayashi | 358/1.15 |
| 2006/0017952 A1* | 1/2006 | Ataka | 358/1.13 |
| 2006/0039024 A1* | 2/2006 | Iida et al. | 358/1.14 |
| 2006/0039707 A1* | 2/2006 | Mima | 399/23 |
| 2006/0056872 A1* | 3/2006 | Hosoi | 399/81 |
| 2006/0092462 A1* | 5/2006 | Mokuya | 358/1.15 |
| 2006/0103866 A1* | 5/2006 | Saka et al. | 358/1.13 |
| 2006/0232812 A1* | 10/2006 | Shimizu | 358/1.14 |
| 2007/0220365 A1* | 9/2007 | Castellani et al. | 714/46 |
| 2007/0286530 A1* | 12/2007 | Asasaka et al. | 382/305 |
| 2008/0012892 A1* | 1/2008 | Imoto | 347/19 |
| 2008/0015918 A1* | 1/2008 | Pangrazio et al. | 705/8 |
| 2008/0049246 A1* | 2/2008 | Kim | 358/1.15 |
| 2008/0068646 A1* | 3/2008 | Kobayashi | 358/1.15 |
| 2008/0309979 A1* | 12/2008 | Honda | 358/1.17 |
| 2009/0002770 A1* | 1/2009 | Cavill et al. | 358/402 |
| 2009/0021776 A1* | 1/2009 | Dolan et al. | 358/1.15 |
| 2009/0182794 A1* | 7/2009 | Sekiguchi | 707/206 |
| 2010/0058123 A1* | 3/2010 | Yamashirodani et al. | 714/57 |
| 2010/0179965 A1* | 7/2010 | Koshigaya | 707/783 |
| 2010/0225951 A1* | 9/2010 | Koshigaya | 358/1.14 |
| 2010/0231944 A1* | 9/2010 | Takahashi | 358/1.13 |
| 2011/0161746 A1* | 6/2011 | Ooya | 714/57 |
| 2011/0235120 A1* | 9/2011 | Kinoshita et al. | 358/1.15 |
| 2012/0019581 A1* | 1/2012 | Miura | 347/14 |
| 2012/0050784 A1* | 3/2012 | Kawaura | 358/1.14 |
| 2012/0105913 A1* | 5/2012 | Takeichi | 358/1.16 |
| 2012/0188600 A1* | 7/2012 | Oshima et al. | 358/1.15 |
| 2012/0197929 A1* | 8/2012 | Williams | 707/769 |
| 2013/0100493 A1* | 4/2013 | Otsuka et al. | 358/1.15 |
| 2013/0119131 A1* | 5/2013 | Cong et al. | 235/437 |
| 2013/0155446 A1* | 6/2013 | Matsuoka | 358/1.14 |
| 2014/0168688 A1* | 6/2014 | Sato | 358/1.14 |

OTHER PUBLICATIONS

U.S. Appl. No. 13/886,027, filed May 2, 2013. Applicant: Koshigaya Motoki.

* cited by examiner

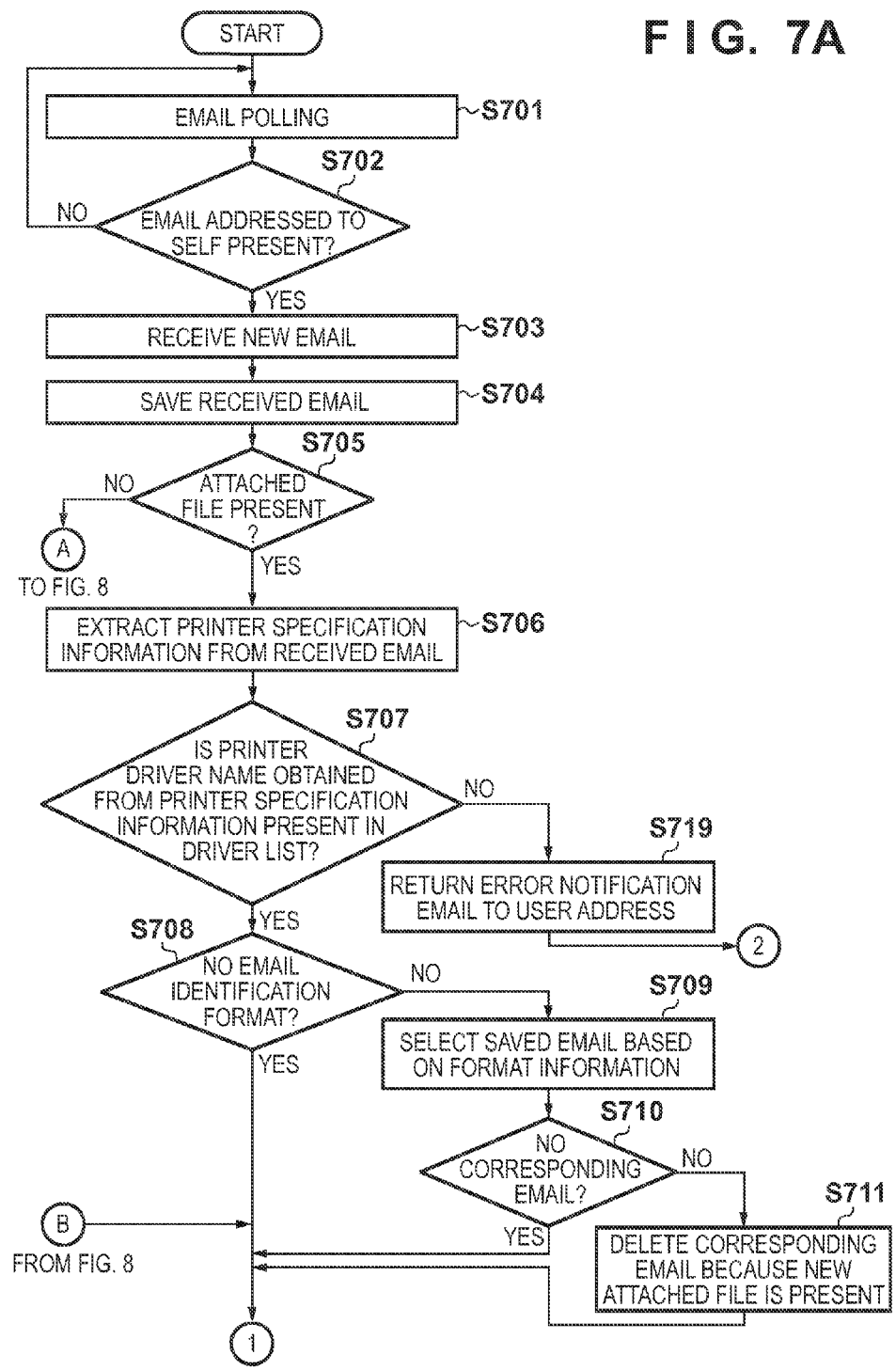

F I G. 9A

| To : USER@mailprint.xx.jp |
| From : PrintServer@mailprint.xx.jp |
| Sub : Re:LBP99999 |

THERE WAS A MISTAKE IN THE PRINTER SPECIFICATION IN THE EMAIL THAT WAS SENT FOR PRINTING.

THE FOLLOWING IS A LIST OF PRINTERS THAT ARE CAPABLE OF PRINTING.
****************
LBP100
LBP200
LBP300
****************
PLEASE CHANGE THE SUBJECT TO ONE OF THESE PRINTERS AND REPLY WITH A QUOTE.

Request Mail:User@mailprint.xx.jp
Time stamp:2011/03/25 08:58:12

F I G. 9B

| To : USER@mailprint.xx.jp |
| From : PrintServer@mailprint.xx.jp |
| Sub : Re:LBP100 |

THE EMAIL THAT WAS SENT FOR PRINTING DOES NOT HAVE A COMPATIBLE FILE FORMAT.

PLEASE USE THE SYSTEM AFTER CONFIRMING THE COMPATIBLE FILE FORMATS.

COMPATIBLE FILE FORMATS ARE AS LISTED BELOW.
****************
.txt .jpeg .bmp .tiff .gif .png .xps .pdf
.doc .docm .docx .docxdot .dotm .dotx
.xls .xlsm .xlsb .xlsx .xim .mht .mhtml
.ppt .pptm .pptx .potx
****************

FIG. 9D

To : USER@mailprint.xx.jp

From : PrintServer@mailprint.xx.jp

Sub : Re:LBP99999

AN EMAIL TO BE PRINTED WAS RECENTLY REPROCESSED, BUT BECAUSE X MINUTES HAVE PASSED, THE FILE TO BE PRINTED WAS DELETED FOR SECURITY REASONS.

TO PRINT, PLEASE ATTACH THE FILE AND RESEND YOUR EMAIL.

FIG. 9C

To : USER@mailprint.xx.jp

From : PrintServer@mailprint.xx.jp

Sub : Re:LBP100

PRINTING WAS NOT PROPERLY COMPLETED FOR THE EMAIL THAT WAS SENT FOR PRINTING.

THERE MAY BE A PROBLEM WITH THE PRINTER.

ONCE THE PROBLEM HAS BEEN SOLVED, PLEASE REPLY WITH A QUOTE.
IF THE REPLY IS RECEIVED WITHIN X MINUTES, PRINTING CAN BE PERFORMED WITHOUT RESENDING THE ATTACHED FILE.

Request Mail:User@mailprint.xx.jp
Time stamp:2011/03/25 08:58:12

F I G. 9E

To : USER@mailprint.xx.jp

From : PrintServer@mailprint.xx.jp

Sub : Re:LBP100

A QUOTED RESPONSE FOR PERFORMING THE PRINT PROCESS AGAIN WAS NOT INCLUDED IN THE EMAIL SENT FOR PRINTING.
TO REPROCESS, PLEASE REPLY WITH A QUOTE.

ALTERNATIVELY, IF PRINTING A NEW FILE, PLEASE ATTACH A FILE AND RESEND YOUR EMAIL.

*YOUR SAVED EMAIL FILE
Request Mail:User@mailprint.xx.jp
Time stamp:2011/03/25 08:58:12

F I G. 9F

To : USER@mailprint.xx.jp

From : PrintServer@mailprint.xx.jp

Sub : Re:LBP100

A FILE TO BE PRINTED WAS NOT ATTACHED TO THE EMAIL SENT FOR PRINTING.

PLEASE ATTACH A FILE TO BE PRINTED AND RESEND THE EMAIL.

FIG. 9G

```
To : USER@mailprint.xx.jp

From : PrintServer@mailprint.xx.jp

Sub : Re:LBP100000

THERE WAS ANOTHER ERROR IN THE PRINTER
SPECIFIED IN THE EMAIL SENT FOR PRINTING.

THE FOLLOWING IS A LIST OF PRINTERS THAT
ARE CAPABLE OF PRINTING.
*******************
LBP100
LBP200
LBP300
*******************
PLEASE CHANGE THE SUBJECT TO ONE OF
THESE PRINTERS AND REPLY WITH A QUOTE.

Request Mail:User@mailprint.xx.jp
Time stamp:2011/03/25 08:58:12
```

FIG. 9H

```
To : USER@mailprint.xx.jp

From : PrintServer@mailprint.xx.jp

Sub : Re:LBP99999

AN EMAIL TO BE PRINTED WAS RECENTLY
REPROCESSED, BUT BECAUSE X MINUTES
HAVE PASSED, THE FILE TO BE PRINTED WAS
DELETED FOR SECURITY REASONS.

TO PRINT, PLEASE ATTACH THE FILE AND
RESEND YOUR EMAIL.

IN ADDITION, THERE IS A MISTAKE IN THE
SPECIFIED PRINTER. THE FOLLOWING IS
A LIST OF PRINTERS THAT ARE CAPABLE OF
PRINTING.
*******************
LBP100
LBP200
LBP300
*******************
```

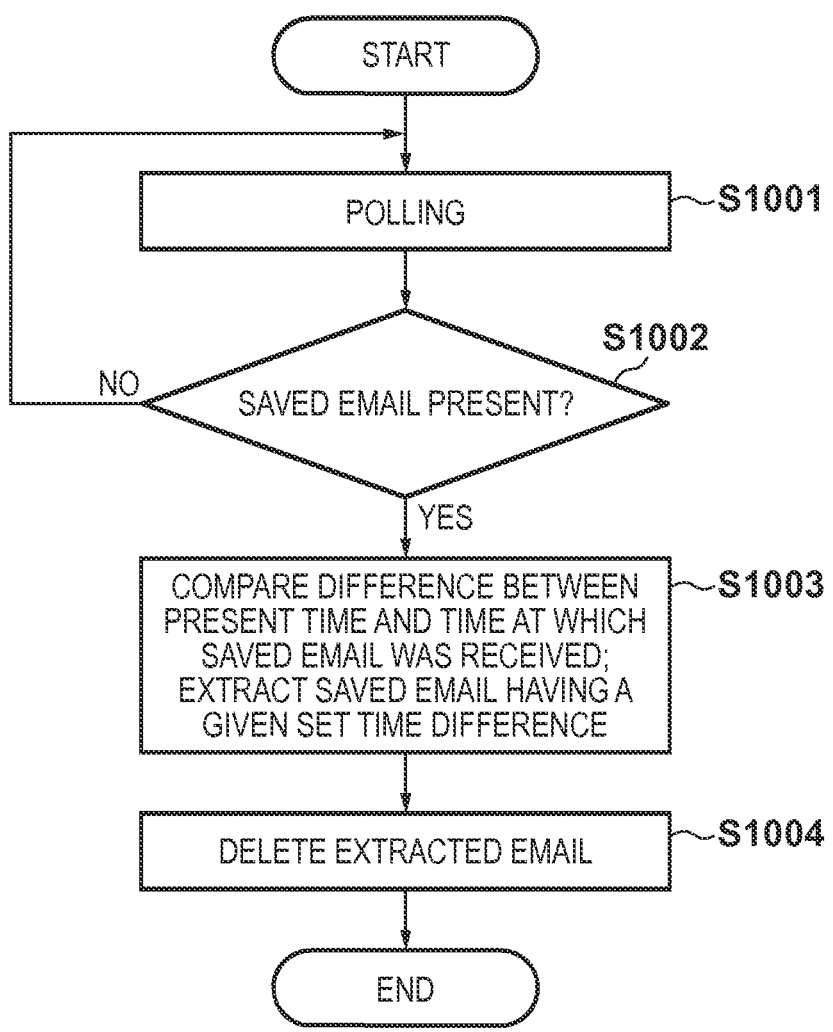

FIG. 11

| No. | EXTENSION | FILE TYPE | APPLICATION NAME |
|---|---|---|---|
| 1 | pdf | pdf doc | pdf SOFTWARE |
| 2 | jpg | IMAGE | jpg SOFTWARE |
| 3 | htm,html | HTML doc | HTML SOFTWARE |
| 4 | txt | Text doc | TEXT EDITING SOFTWARE |

FIG. 12

| PRINTER DRIVER | PRINTER NAME |
|---|---|
| LBP100 | 100 |
| LBP200 | 200 |
| LBP300 | 300 |
| ⋮ | ⋮ |
| LBP800 | 800 |
| LBP900 | 900 |

INFORMATION PROCESSING APPARATUS, PRINTING SYSTEM, ERROR NOTIFICATION METHOD, AND STORAGE MEDIUM STORING PROGRAM THEREOF

BACKGROUND OF THE INVENTION

1. Field of the Invention

The present invention relates to information processing apparatuses that control printers, printing systems, an error notification method, and a storage medium storing a program thereof.

2. Description of the Related Art

Thus far, a printing system in which a file to be printed is attached to an email in an email application in a mobile terminal, the email is sent to a printer, and printing is executed has been known (see Japanese Patent Laid-Open No. 2004-220606). In this printing system, an email address is assigned to the printer in advance, the email is sent to that email address, and the file that is attached to the email is then printed. In such a printing system, the printer requests an email address from a server during initial setup, and obtains and stores a unique email address. A user then attaches a file to be printed to an email in his or her mobile terminal and sends the email to the email address of the printer.

A system that prints files attached to emails from mobile terminals using a dedicated adapter installed between a server and a printer is also known (see Japanese Patent Laid-Open No. 2001-312392).

When sending an email to which a file is attached from a mobile terminal, it is necessary for the user to specify a desired printer. In such a case, it is possible that the user will make an error in his or her input, resulting in the desired printer not being properly specified. Because the user did not make the error on purpose, he or she may be unaware of the error, and may continue waiting by the printer for the file to be printed despite the fact that that printer is not the printer that will print the user's file. It is also conceivable that the user will forget to specify the printer from the outset. It is further conceivable that the user will forget to attach the file that he or she wishes to print.

There are thus many conceivable cases of operational mistakes on the part of the user, and because conventional systems that use mobile terminals and email do not notify users of printing errors based on those various types of cases, users cannot know how to properly respond to such errors; such systems have therefore been greatly lacking in convenience.

SUMMARY OF THE INVENTION

An aspect of the present invention is to eliminate the above-mentioned problems with the conventional technology. The present invention provides, in a printing method that uses email, a system for improving the convenience for a user when a printing error has occurred.

The present invention in its first aspect provides an information processing apparatus comprising: a receiving unit configured to receive, from an email server, an email requesting an attached file to be printed; and a sending unit configured to, in a case where printing of the attached file of the email received by the receiving unit is not completed, send an error notification indicating that the printing is not completed to the email server as a reply to the email received by the receiving unit.

The present invention in its second aspect provides a printing system comprising: an information processing apparatus including a receiving unit configured to receive, from an email server, an email requesting an attached file to be printed, and a sending unit configured to, in a case where printing of the attached file of the email received by the receiving unit is not completed, send an error notification indicating that the printing is not completed to the email server as a reply to the email received by the receiving unit; a mobile terminal configured to send the email requesting the attached file to be printed to the email server; and a printer configured to print the attached file.

The present invention in its third aspect provides an error notification method executed by an information processing apparatus, the method including: a receiving step of receiving, from an email server, an email requesting an attached file to be printed; and a sending step of, in a case where printing of the attached file of the email received in the receiving step is not completed, sending an error notification indicating that the printing is not completed to the email server as a reply to the email received in the receiving step.

The present invention in its fourth aspect provides a computer-readable storage medium in which is stored a program that causes a computer to execute: a receiving step of receiving, from an email server, an email requesting an attached file to be printed; and a sending step of, in a case where printing of the attached file of the email received in the receiving step is not completed, sending an error notification indicating that the printing is not completed to the email server as a reply to the email received in the receiving step.

The present invention in its fifth aspect provides an information processing apparatus which is able to communicate with a printing apparatus, the apparatus comprising: a receiving unit configured to receive an email to which a file is attached, wherein the email includes information indicating a printing apparatus for executing a print of the file; a determining unit configured to determine whether or not the printing apparatus indicated by the information is usable by the information processing apparatus; and a sending unit configured to, in a case where the determining unit determines that the printing apparatus indicated by the information is not usable by the information processing apparatus, send an email to a source of the received email, wherein the email includes information indicating that the print of the file is not finished.

According to the present invention, it is possible, in a printing method that uses email, to improve the convenience for a user when a printing error has occurred.

Further features of the present invention will become apparent from the following description of exemplary embodiments (with reference to the attached drawings).

BRIEF DESCRIPTION OF THE DRAWINGS

FIGS. 7A and 7B are diagrams illustrating, in detail, the steps of the processes from S631 to S635 in FIG. 6.

FIGS. 9A to 9I are diagrams illustrating examples of various types of error notifications displayed in a mobile terminal device.

FIG. 10 is a diagram illustrating the steps of a process that deletes a saved email after a time limit.

FIG. 11 is a diagram illustrating correspondences between file extensions and applications.

FIG. 12 is a diagram illustrating a list of correspondences between printer driver names and printer names.

DESCRIPTION OF THE EMBODIMENTS

Figure 1:
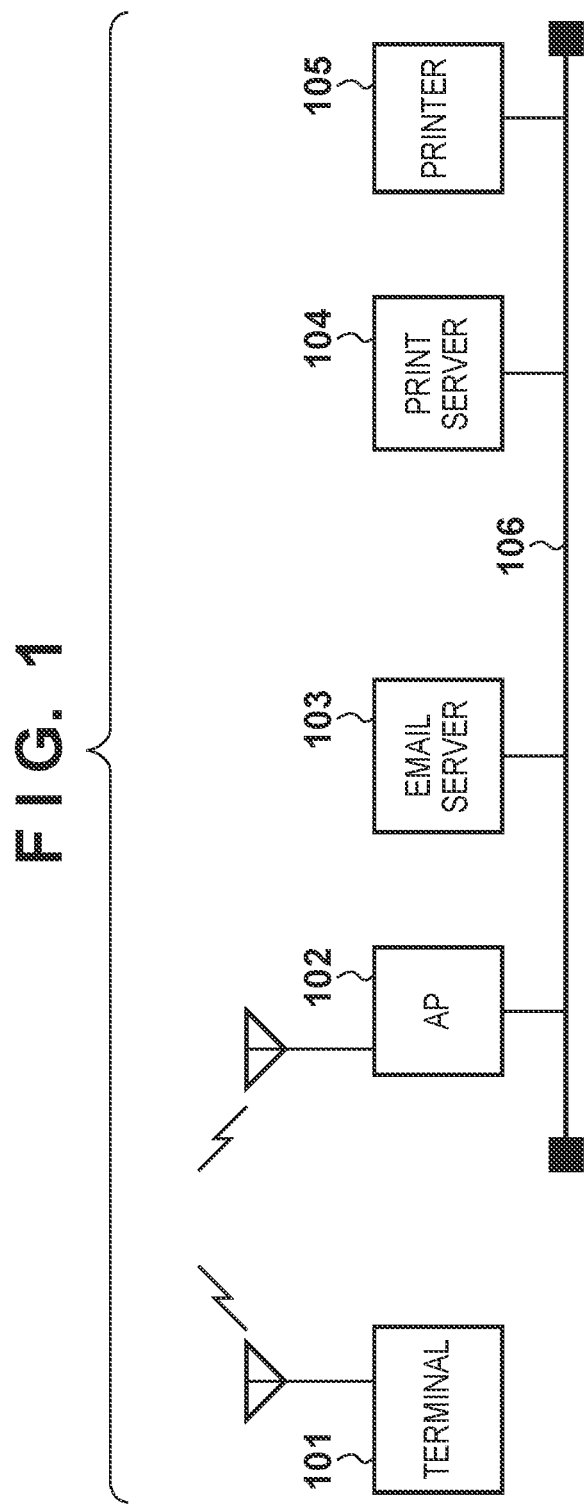
FIG. 1 is a diagram illustrating the overall configuration of a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements will be given identical reference numerals, and descriptions thereof will be omitted.

FIG. 1 is a diagram illustrating the overall configuration of a printing system according to the present embodiment. In this printing system, a mobile terminal device 101 is capable of issuing a request to a print server 104 for a printer 105 to execute a printing by sending an email to which a file that is to be printed is attached. The mobile terminal device 101 is of a size that can be held and carried by hand, has an operating system (OS) installed therein, and is capable of executing various applications through the OS. In the present embodiment, emails are sent through wireless communication by executing an email application, which is one such stated application, in the mobile terminal device 101. The mobile terminal device 101 can connect to a network 106 through an access point (AP) 102. Here, the network 106 is, for example, a wired LAN (local area network). The following descriptions will be given assuming that the network 106 is a wired LAN. The internal configuration of the access point 102 will be described with reference to FIG. 2. A generic PC, for example, is used as an email server 103. An email server application is installed in the email server 103. The internal configuration of the email server 103 will be described with reference to FIG. 3. Emails that have been sent from the mobile terminal device 101 are held in the email server 103.

Like the email server 103, an information processing apparatus such as a generic PC is used as the print server 104. The internal configuration of the print server 104 will be described with reference to FIG. 3. Printer drivers that correspond to each of a plurality of printers connected to a wired LAN 106 are installed in the print server 104. The printer 105 prints onto a recording medium such as paper based on print data in response to a print command from the print server 104. The wired LAN 106 employs, for example, an Ethernet® cable, and connects the access point 102, the email server 103, the print server 104, and the printer 105 to each other in a communicable state.

Figure 2:
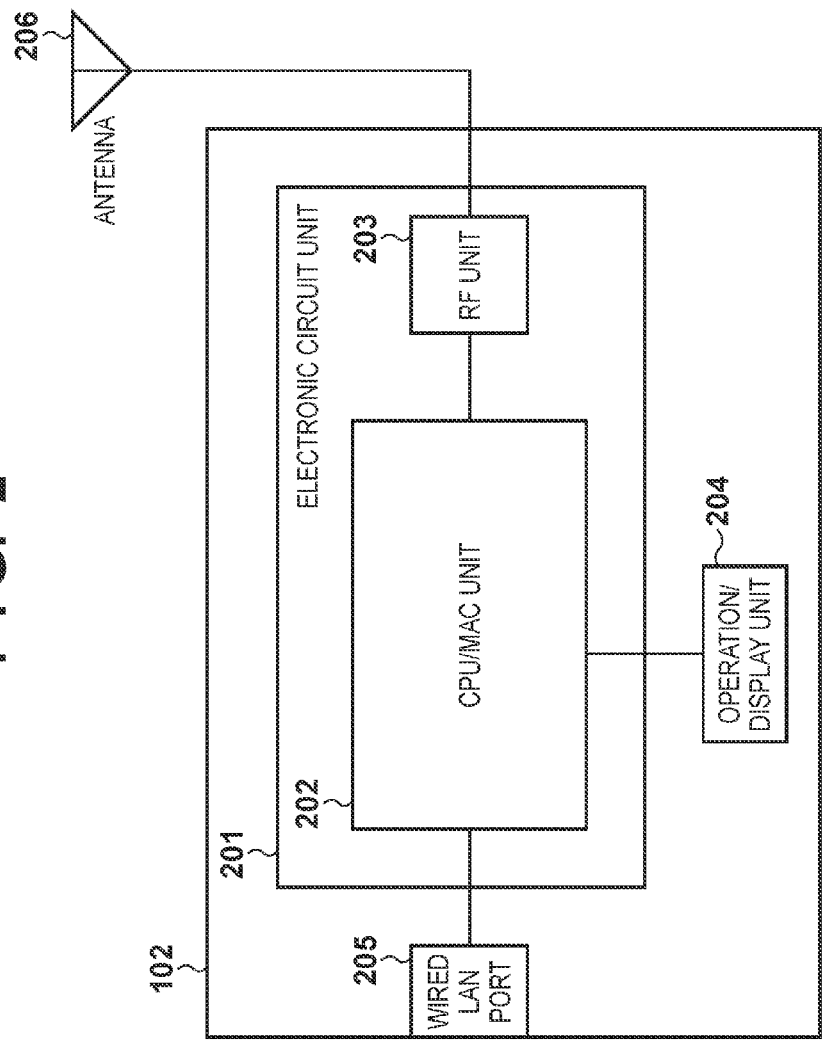
FIG. 2 is a block diagram illustrating the internal configuration of an access point.

FIG. 2 is a block diagram illustrating the internal configuration of the access point 102. The access point 102 is an apparatus for enabling a device connected to a wireless communication network (for example, the mobile terminal device 101) and a device connected to a wired communication network (for example, the email server 103) to communicate with each other. The access point 102 includes an electronic circuit unit 201, an operation/display unit 204, and a wired LAN port 205. The wired LAN port 205 has a connector that is capable of connecting to, for example, an Ethernet cable, in order to connect to the wired LAN 106. The operation/display unit 204 includes LEDs, switches, and so on, and displays states of the access point 102 itself, states of various ports, and so on in an identifiable manner. The operation/display unit 204 may also include switches or the like for easily connecting to a wireless LAN. Furthermore, the access point 102 may include security functions for securing the connection to the wireless LAN.

The access point 102 includes a CPU/MAC unit 202 and an RF (radio frequency) unit 203. The CPU/MAC unit 202 includes a CPU and a MAC (media access control) unit (not shown) internally. The CPU/MAC unit 202 also includes various types of processors, memories, and so on. The respective devices within the CPU/MAC unit 202 are connected to each other via a bus (not shown). Furthermore, the MAC unit includes a section for carrying out processing related to wireless communication and a section for carrying out processing related to wired communication.

As shown in FIG. 2, both the CPU/MAC unit 202 and the RF unit 203 are configured within the electronic circuit unit 201. An antenna 206 for sending and receiving radio waves is connected to the RF unit 203. The CPU/MAC unit 202 is connected to the operation/display unit 204, the RF unit 203, and the wired LAN port 205. The access point 102 is connected to the wired LAN 106 via an Ethernet cable (not shown). In this case, one end of the Ethernet cable is connected to the wired LAN port 205, and the other end is connected to a network hub (not shown).

Figure 3:
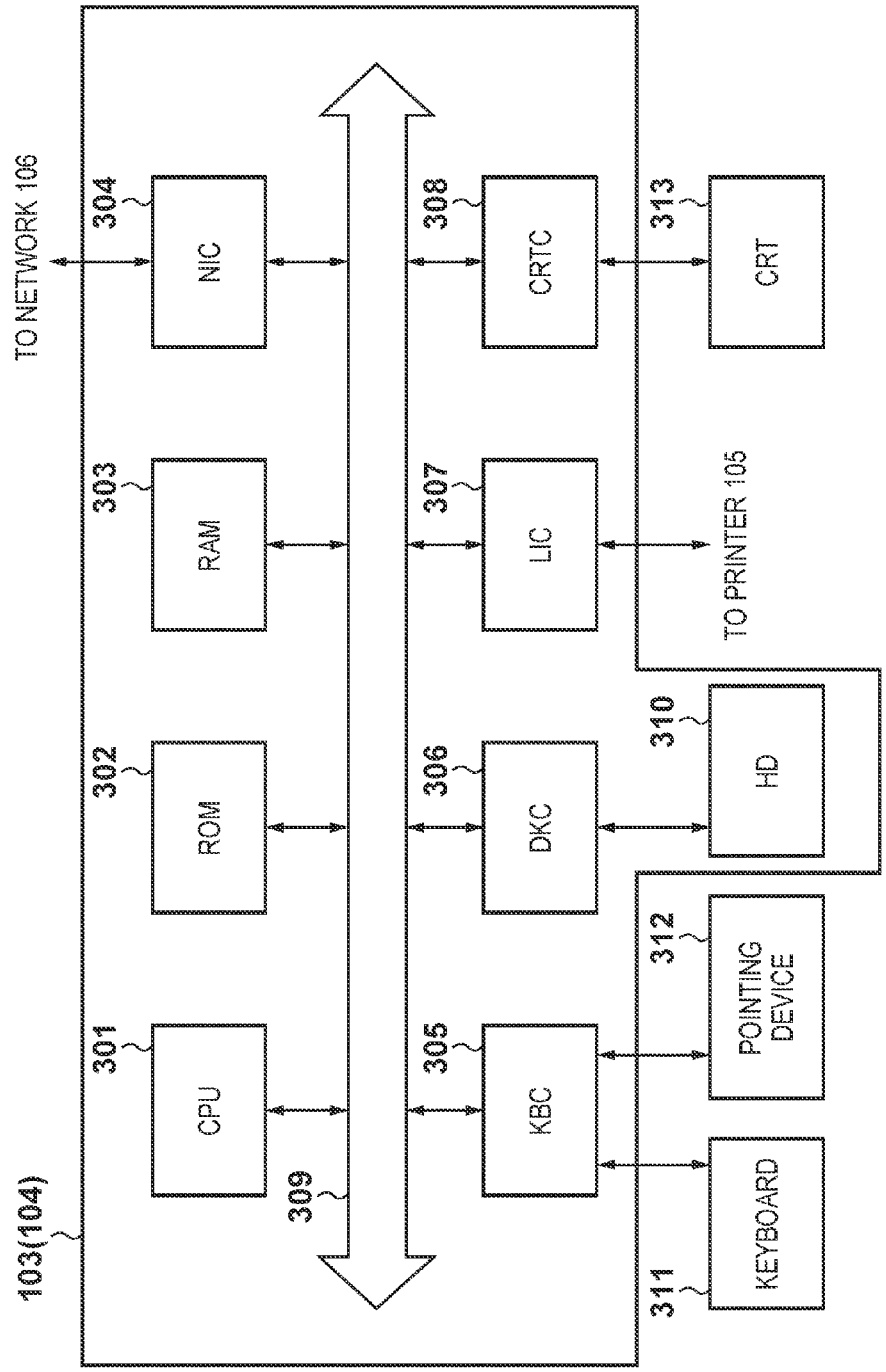
FIG. 3 is a block diagram illustrating the internal configuration of an email server and a print server.

FIG. 3 is a block diagram illustrating the internal configuration of the email server 103 and the print server 104. In the present embodiment, an information processing apparatus such as a generic PC is used as the email server 103 and the print server 104. The email server 103 and the print server 104 each include a CPU 301, a ROM 302, a RAM 303, and a network interface controller (NIC) 304. These units are connected to each other via a bus 309. Furthermore, a keyboard controller (KBC) 305, a disk controller (DKC) 306, a local interface controller (LIC) 307, and a CRT controller (CRTC) 308 are connected to each other via the bus 309.

The aforementioned Ethernet cable, for example, is connected to the network interface controller (NIC) 304. A keyboard 311 and a pointing device 312 are connected to the keyboard controller (KBC) 305. A hard disk (HD) 310 is connected to the disk controller (DKC) 306. Peripheral devices are connected to the local interface controller (LIC) 307 via USB or the like. Although FIG. 3 illustrates an example in which the printer 105 is connected via the LIC 307, other peripheral devices may be connected as well. The printer 105 may also be connected via the NIC 304, as shown in FIG. 1. A CRT display 313 is connected to the CRT controller (CRTC) 308. A basic I/O program, an operating system (OS), and so on are stored in the ROM 302. The CPU 301 manages and executes various types of application programs based on the OS.

A mobile terminal printing application, various types of application programs, and so on for realizing the operations described in the present embodiment, printer drivers and the like for enabling the print server 104 to control printers, and so on are stored in the hard disk (HD) 310 of the print server 104. Here, the "mobile terminal printing application" is an application for realizing operations in the printing system that enables attached files from a mobile terminal to be printed, as exemplified by the operations shown in FIG. 6. The mobile terminal printing application program stored in the hard disk 310 of the print server 104 realizes processes such as those shown in, for example, FIGS. 7A, 7B and 8. The print server 104 includes an email client function, a printer control function, and so on, and can execute the sending/receiving of emails, the printing of files attached to emails, and so on by using those functions. An email server function of the email server 103 will be described with reference to FIG. 5.

Figure 4:
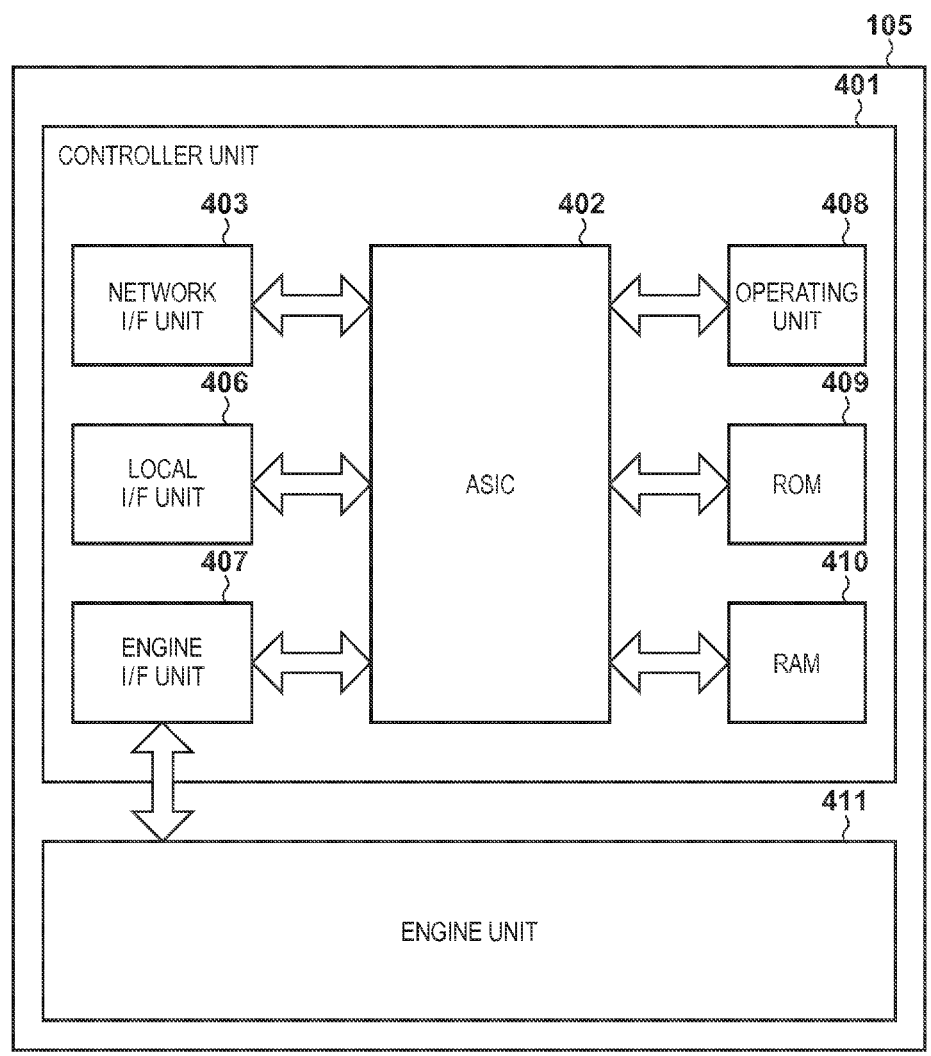
FIG. 4 is a block diagram illustrating the internal configuration of a printer.

FIG. 4 is a block diagram illustrating the internal configuration of the printer 105. A controller unit 401 performs a printing process on print data received via a network interface unit 403, a local interface unit 406, or the like. The controller unit 401 includes a CPU (not shown) and an ASIC 402 that primarily passes the print data to an engine unit 411. Meanwhile, an operating unit 408 displays the printing status of the printer to a user, and accepts instructional operations from the user. A ROM 409 stores various types of programs. A RAM 410 is used as an image expansion region when performing the printing process on the print data, a working region for the CPU, and so on. Meanwhile, the network interface unit 403 communicates with the print server 104 and the like via Ethernet, USB, or the like. Peripheral devices are connected to a local interface controller (LIC) 406 via USB or the like. In addition, an engine interface unit 407 sends print data on which a printing process has been carried out to the engine unit 411. In addition, the engine unit 411 controls various printing mechanisms, such as a recording head and the like, so as to print onto a recording medium such as paper based on the print data that has been sent. Note that "printer" includes all apparatuses provided with at least a printing function, such as multi function apparatuses, fax machines, and the like.

Figure 5:
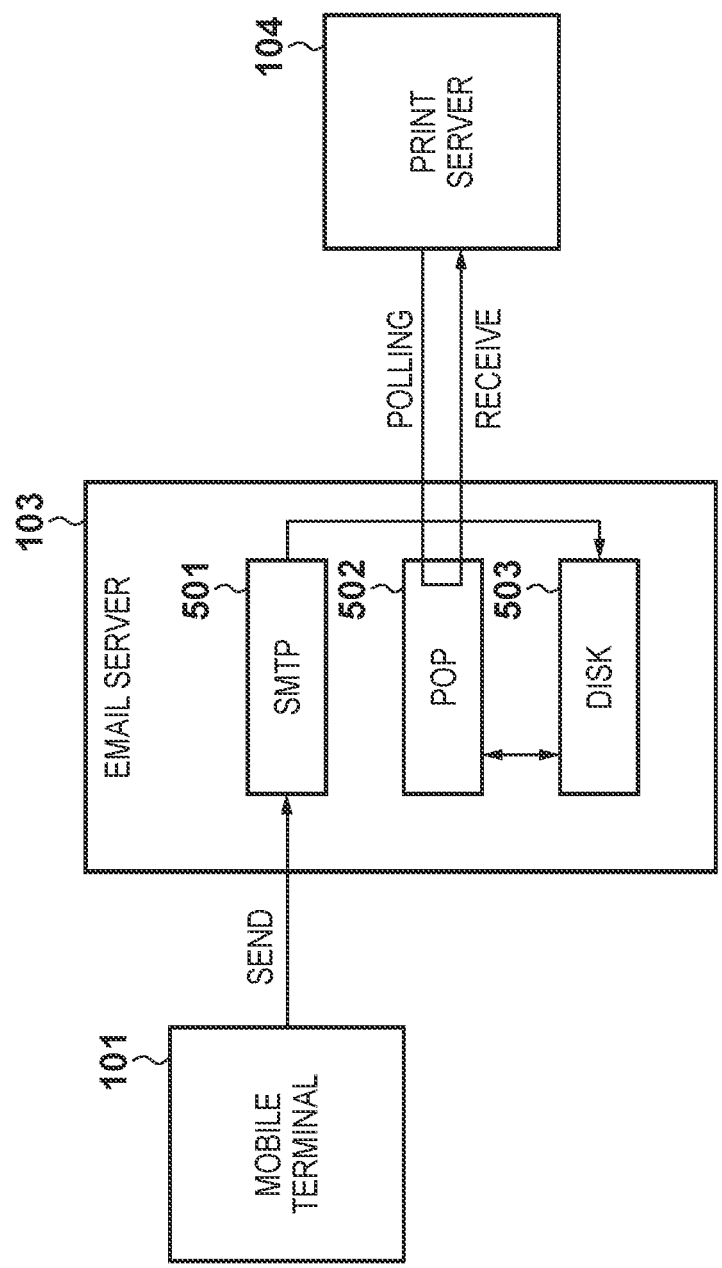
FIG. 5 is a diagram illustrating email sending/receiving operations.

FIG. 5 is a diagram illustrating email sending/receiving operations, focusing on the email server 103. First, operations through which the email server 103 receives an email will be described. An SMTP (Simple Mail Transfer Protocol) server 501 and a POP (Post Office Protocol) server 502 operate within the email server 103. The mobile terminal device 101 sends an email to the email server 103 through an email application. The email that has been sent is received, via the access point 102 (not shown), by the email server 103 that is connected to the wired LAN 106. When sending the email, the email application in the mobile terminal device 101 specifies an email address of the email server 103, which has been set in advance. For example, this email address is specified as "USER@mailprint.xx.jp". Having received the email, the email server 103 stores the email in a hard disk 503 in the email server 103 (this hard disk corresponds to the hard disk 310 shown in FIG. 3).

Next, operations through which the print server 104 receives an email from the email server 103 will be described. Through operations performed by a mobile printing application, the print server 104 polls the POP server 502 of the email server 103 in order to confirm whether or not an email for which there is a print request has been received from the mobile terminal device 101. At this time, the print server 104 specifies a pre-set email address. Meanwhile, the polling interval is set as desired by the mobile printing application.

The POP server 502 of the email server 103 requests a username and password for access in response to the polling from the print server 104. Once the correct username and password have been confirmed, the email server 103 responds to the print server 104 as to whether or not an email addressed to the print server 104, or in other words, an email addressed to the email address specified by the print server 104 as described above, is present among the emails stored in the email server 103. In the case where such an email is stored in the POP server 502 of the email server 103, the POP server 502 sends that email to the print server 104. After this, the print server 104 can obtain the email from the email server 103. A configuration that is the opposite of that shown in FIG. 5, in which the sender of the email is the print server 104 and the recipient of the email is the mobile terminal device 101, is also possible. The email can be sent from the print server 104 to the mobile terminal device 101 by the email server 103 operating in the same manner as above in such a case as well. Such operations are performed in the case where the print server 104 replies to the email received from the email server 103.

Figure 14:
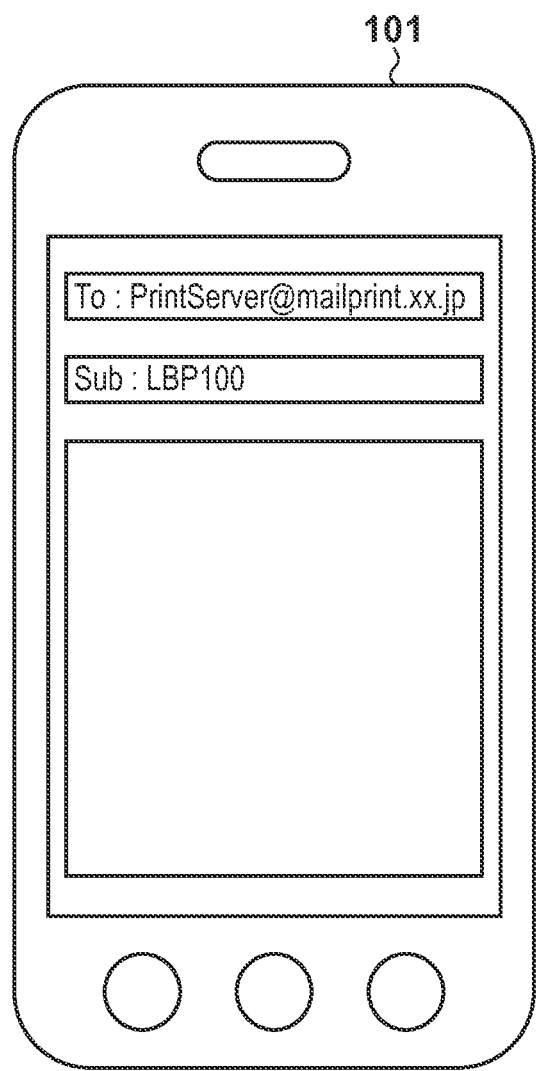
FIG. 14 is a diagram illustrating an example of an email sending screen.

Hereinafter, the flow of a process from when the mobile terminal device 101 sends an email to which a file to be printed is attached, to when the printer 105 prints that file, will be described with reference to FIG. 6. First, in S601, the email application of the mobile terminal device 101 attaches a file that the user wishes to print to an email and sends that email. FIG. 14 is a diagram illustrating an example of an email sending screen displayed in a display screen of the mobile terminal device 101 as a result of display control performed by the email application. As shown in FIG. 14, an email address of, for example, "PrintServer@mailprint.xx.jp" is inputted by the user into an address field. In addition, a printer name and a printer driver name of the printer that is to print the file are inputted in a subject field. Here, the printer name may be inputted into the body of the email rather than the subject field. For example, "LBP100" is inputted in the subject field. Note that the printer name is merely one example of an identifier for identifying the printer, and other information, such as an IP address or the like, may be used, as long as it is information that makes it possible to identify the printer. In this case, information such as IP addresses or the like are managed in association with the printer drivers in the table shown in FIG. 12.

Once the user has performed operations for sending the email, the email is sent to the access point 102 via wireless LAN. Although the present embodiment mentions wireless LAN, other communication schemes, such as a 3G network or the like, may be used as well, as long as they are communication schemes that are capable of sending emails.

In S611, the access point 102 receives the email sent from the mobile terminal device 101 via the wireless LAN. Specifically, a wireless signal expressing the email is inputted through the antenna 206. The wireless signal is converted from an analog signal into a digital signal by the RF unit 203. Thereafter, the CPU/MAC unit 202 analyzes the address, path, and so on of the email from the digital signal obtained through the conversion, and sends this information over the wired LAN 106 via the wired LAN port 205. In S612, the access point 102 sends the email to the SMTP server 501 of the email server 103 via the wired LAN 106. In S621, the email server 103 receives the email, and in S622, the email is stored in the hard disk 310 along with the file attached thereto.

At this point in time, in S631, the print server 104 polls the POP server 502 of the email server 103 at a set time interval. The polling operations are as illustrated in FIG. 5. Next, in S623, the email server 103 determines whether or not it is being polled by the print server 104. Here, in the case where the email server 103 has determined that it is being polled, in S624, the POP server 502 of the email server 103 sends an email corresponding to the email address specified by the print server 104, and the file attached thereto, to the print server 104. When the print server 104 receives an email in S632, the file attached to the email is analyzed in S633. Based on the result of the analysis, in S634, the print server 104 determines whether or not the attached file is a file that is to be printed. Here, in the case where it is determined that the file is to be printed, in S635, the print server 104 expands the file attached to the email into print data that can undergo a printing process in the printer 105 (for example, PDL (page description language) data that corresponds to respective printers), and sends this print data to the printer 105.

Note that in the present embodiment, the file attached to the email is referred to as an "attached file" up until the file is analyzed by the print server 104 in S633. However, the data that has been expanded into data that can undergo a printing process in the printer 105 after the analysis performed by the print server 104 in S633 is referred to as "print data". The processes from S631 to S635 will be described in detail with reference to FIGS. 7A and 7B. In S641, the printer 105 receives the print data from the print server 104, and in S642, the printer 105 prints onto a recording medium such as paper based on that print data.

Figure 6:
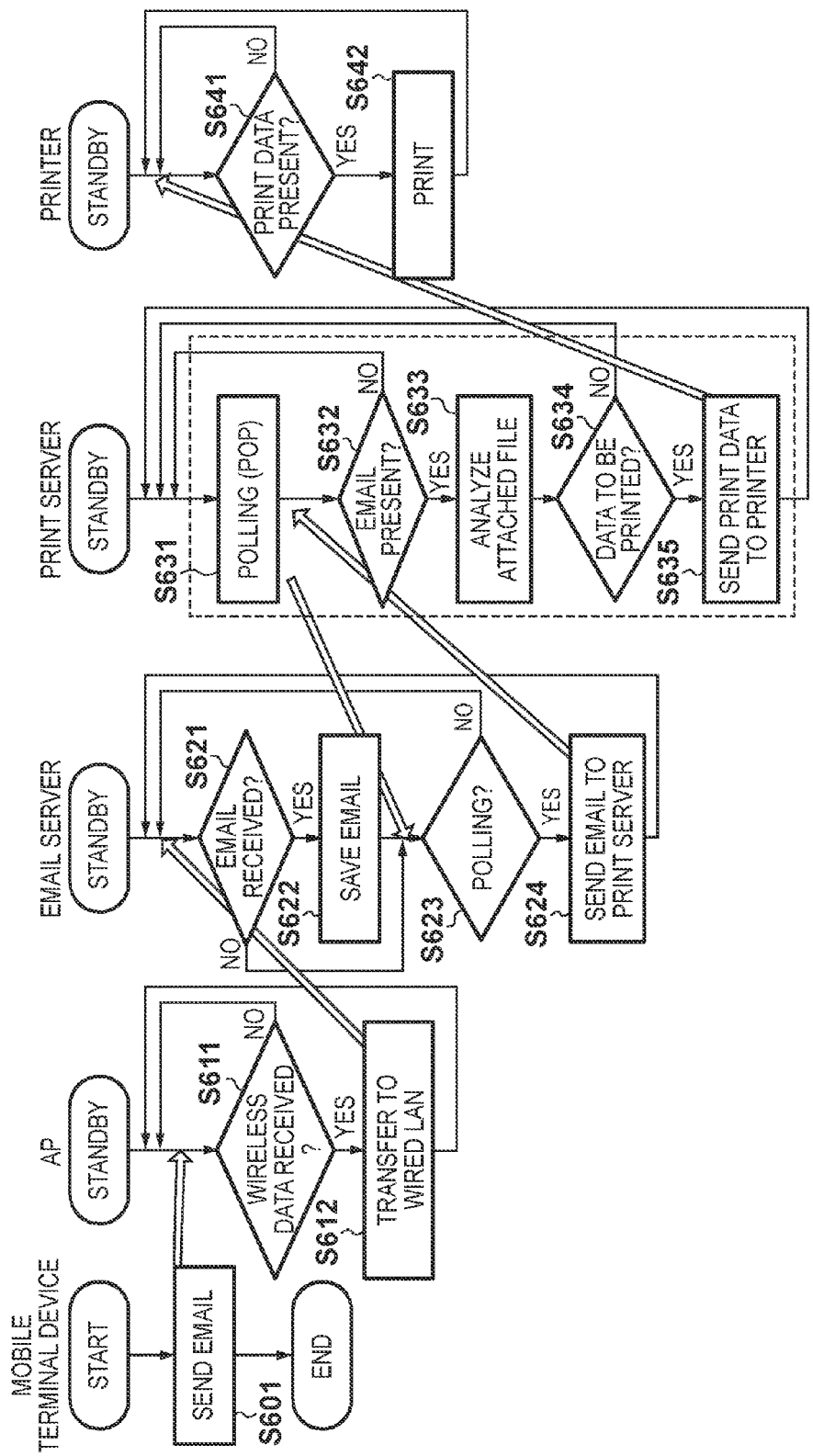
FIG. 6 is a diagram illustrating a flow of operations through which a file that is to be printed is printed by a printer.

Hereinafter, the processes of S631 to S635 performed by the print server 104 as illustrated in FIG. 6 will be described in detail with reference to FIGS. 7A, 7B, 8, and 9A to 9I. In addition, a process for deleting emails held in the hard disk 310 of the print server 104 after a given time limit will be described with reference to FIG. 10. In the present embodiment, unnecessary emails are deleted and security is improved by carrying out a process such as that shown in FIG. 10. The processes illustrated in FIGS. 7A, 7B, 8, and 10 are realized by the CPU 301 of the print server 104 expanding, in the RAM 303, programs stored in the ROM 302 or the hard disk 310 and executing those programs.

In the present embodiment, in the case where there is a mistake in the printer driver name added to the received email or that field itself has been left blank, or in other words, in the case where the attached file does not include a factor for causing an error to occur, the print server 104 temporarily stores that email along with the attached file. An email in which is written an error notification corresponding to one of various types of errors is then returned to the user. In other words, temporarily storing the email that has caused the error along with the attached file makes it possible to eliminate a process that requires the user to resend the attached file. The user receives the error notification email, and can then respond to the error by replying to that email in accordance with instructions for solving the error that are written in that email.

The processes illustrated in FIGS. 7A and 7B will now be described. In S701, the CPU 301 of the print server 104 polls the email server 103 using POP communication or the like, and attempts to receive an email addressed to the print server 104. In S702, the print server 104 determines whether or not there is an email addressed to the print server 104. Here, in the case where it has been determined that there is no email addressed to the print server 104, the polling is continued at a pre-set time interval. On the other hand, in the case where it has been determined that there is an email addressed to the print server 104, in S703, the CPU 301 of the print server 104 receives the email addressed to the print server 104.

In S704, the CPU 301 of the print server 104 stores the received email in the hard disk 310 of the print server 104. In S705, the print server 104 determines whether or not there is a file attached to the received email. Here, in the case where it is determined that there is no attached file, the procedure advances to that shown in FIG. 8, described later. A case in which it is determined that there is no attached file in S705 corresponds to, for example, a case in which the user has simply forgotten to attach the attached file, a case in which the user has resent the email following an error notification (described later), and so on. However, in the case where it has been determined in S705 that there is an attached file, the procedure advances to S706. In S706, the CPU 301 of the print server 104 extracts, from the received email, information specifying the printer that is to perform the printing. Here, the printer driver name inputted in the subject field is extracted as the information for specifying the printer that is to perform the printing, in the same manner as the case illustrated in FIG. 6.

In S707, the CPU 301 of the print server 104 refers to a list, saved in the hard disk 310, of the printer drivers installed in the print server 104. The CPU 301 then determines whether or not a printer driver name obtained from the information extracted in S706 is present among the printer driver names in that list. Here, in the case where it is determined that the printer driver name is not present, the procedure advances to S719. In S719, the print server 104 returns, to the email server 103, an email having a notification that there was an error in the user's operations of the mobile terminal device 101, after which the processing in FIGS. 7A and 7B end. FIG. 9A is a diagram illustrating an example of the content of the error notification sent in S719. As shown in FIG. 9A, a message reading "there was a mistake in the printer specification in the email that was sent for printing" is displayed in a display section of the email, making it possible to notify the user that there was an operational error. A case where the error notification shown in FIG. 9A is returned to the user can be thought to correspond to a case where the user mistakenly inputted or forgot to input the printer driver name, a case where the user did not know which printer can be specified for printing, or the like.

Accordingly, in S719, an email including the notification that the printer specification was mistaken as shown in FIG. 9A, and to which the printer driver names in the list of printer drivers installed in the print server 104 that is saved in the hard disk 310 are attached, is returned to the user. This email includes the user's email address, a timestamp for identifying the email, or some other code that serves the same purpose, in order to associate that email with the email received and saved in S703 and emails that are received in later stages. Hereinafter, the timestamp for identifying the email or other code that serves the same purpose will collectively be referred to hereinafter as an "email identification format". The email identification format is used when the user replies to an error notification email.

The procedure advances to S708 in the case where it has been determined in S707 that the printer driver name obtained from the information extracted in S706 is present in the printer driver list. In S708, the CPU 301 of the print server 104 determines whether or not an email identification format is included in the email received in S703. Here, the procedure advances to S709 in the case where it has been determined that the email identification format is included. On the other hand, the procedure advances to S712 in the case where it has been determined that the email identification format is not included. Thus the procedure advances from S708 to S712 in the case where the user is sending the first email from the mobile terminal device in this system and there are no particular problems. However, the procedure advances to S709 in the case where the user has received an error notification email such as that shown in FIG. 9A and is replying to that email.

In S709, the CPU 301 of the print server 104 selects, from among the emails saved in the hard disk 310 of the print server 104, an email that is associated with the email identification format included in the aforementioned email. In S710, the CPU 301 of the print server 104 determines whether or not there is an email that is associated with the email identification format. Here, in the case where it has been determined that there are no associated emails, the procedure advances to S712 directly in order to print the attached file. However, in the case where it is determined that there is an associated email, the procedure advances to S711.

The procedure advancing to S711 corresponds to a case in which a new attached file is present regardless of the fact that an email associated with the email identification format is saved in the hard disk 310. Accordingly, in this case, the CPU 301 of the print server 104 assumes that the file attached to the email saved in the hard disk 310 is unnecessary, and deletes that file from the hard disk 310. After S711, the procedure advances to S712 in order to print the file attached to the received email.

In S712, the CPU 301 of the print server 104 extracts the file attached to the email from the email in order to execute the print. In S713, the CPU 301 of the print server 104 determines whether or not the attached file extracted in S712 can be processed by the various types of application programs in the print server 104. The determination in S713 may be carried out based on a table such as that shown in FIG. 11, in which the application in the print server 104 that is capable of processing the format of the file attached to the email is set in advance. In this case, the table is stored in, for example, the hard disk 310 of the print server 104.

The procedure advances to S720 in the case where it has been determined in S713 that the attached file cannot be processed by the various types of applications in the print server 104. In S720, the CPU 301 of the print server 104 returns, to the email server 103, an email having a notification that there was an error in the user's operations of the mobile terminal device 101. An example of the error notification displayed in the error notification email in S720 is illustrated in FIG. 9B. As shown in FIG. 9B, a message reading "the email that was sent for printing does not have a compatible file format" is displayed in the display unit of the mobile terminal device 101 of the user, thus making it possible for the user to recognize the cause of the error. In the present embodiment, in S720, a list of file formats that can be processed by the print server 104 is attached to the email that is returned to the user, in addition to the error notification illustrated in FIG. 9B. In S721, the CPU 301 of the print server 104 deletes the received email, and the process illustrated in FIGS. 7A and 7B end.

The procedure advances to S714 in the case where it has been determined in S713 that the attached file can be processed by the various types of applications in the print server 104. In S714, the CPU 301 of the print server 104 switches the printer driver of a default printer to the printer driver indicated by the printer driver name obtained from the information extracted in S706 in order to execute the printing process. In S715, the CPU 301 of the print server 104 refers to the table indicated in FIG. 11, and launches the application that corresponds to the file format of the attached file extracted from the email in S712. Then, the printer 105 is controlled to print by sending a print job to the printer 105 using the printer driver that was switched to in S714.

In S716, the CPU 301 of the print server 104 determines whether the printing based on the print job has succeeded or failed. Here, the procedure advances to S723 in the case where it has been determined that the printing based on the print job has failed. In S723, the CPU 301 of the print server 104 returns an email to the user in order to notify the user of an error that the printing process was not properly completed for some reason. An example of the error notification displayed in the error notification email in S723 is illustrated in FIG. 9C. As shown in FIG. 9C, a message reading "printing was not properly completed for the email that was sent for printing. There may be a problem with the printer" is displayed in the display unit of the mobile terminal device 101 of the user, and thus the user can recognize that a printing error has occurred. A case in which an error notification such as that shown in FIG. 9C is returned to the user via email corresponds to, for example, a case in which the printer 105 is turned off, a paper jam has occurred, or the like. Furthermore, in the case where an error notification such as that shown in FIG. 9C is returned to the user, there is no particular problem with the attached file, and thus information indicating that the printing process can be attempted again after a predetermined amount of time is written in the error notification along with the email identification format. This email identification format is used when the user replies to an email in which the error notification shown in FIG. 9C is displayed. After the processing of S723, in S718, the CPU 301 of the print server 104 restores the printer driver to the printer driver that is set as the default.

In the case where it has been determined in S716 that the printing based on the print job has succeeded, in S717, the CPU 301 of the print server 104 deletes the associated emails saved in the hard disk 310 after the printing process for the attached file has been performed. Here, the emails to be deleted are the email that is the current target of the printing process, as well as, in the case where an email identification format is added to that email, other emails that are associated as a result of the email identification format. In other words, in the case where the series of processes for printing the attached file that the user wishes to print has ended properly, all of the associated emails, including the emails that were saved in the hard disk 310 of the print server 104 due to erroneous operations of the mobile terminal device 101 by the user, are deleted. Such a configuration makes it possible to ensure security by preventing unnecessary emails from being left behind and the information written therein from being leaked or the like. After the process of S717, the procedure advances to S718.

Generally, a default printer is set in the print server 104 in which the printer drivers are installed. Accordingly, in the present embodiment, the printer driver is restored to the default printer driver after a predetermined application has been launched. As indicated in S719, in the present embodiment, the user is notified of an error via email in the case where there is no information indicating the printer that is specified to execute the print. However, in the present embodiment, the job may be outputted to the default printer in such a case.

Next, a process by which the print server 104 deletes an email stored in the hard disk 310 of the print server 104 after a given time limit will be described with reference to FIG. 10. The process illustrated in FIG. 10 is realized by the CPU 301 of the print server 104 expanding, in the RAM 303, a program stored in the ROM 302 or the hard disk 310, and executing that program.

In S1001, the CPU 301 of the print server 104 starts polling the hard disk 310 as to whether or not a saved email is present. The polling interval can be set as desired in accordance with the usage environment for the user. In the case where there is no email saved in the hard disk 310, in S1002, the CPU 301 of the print server 104 once again polls the hard disk 310 after a predetermined polling interval. However, in the case where it is determined as a result of the polling that an email is saved in the hard disk 310, in S1003, emails for which a time difference between the current time and the time at which the saved email was received is greater than or equal to a pre-set time difference are extracted. Here, the pre-set time difference expresses an elapsed time after which the email should be deleted, and can be set as desired in accordance with the usage environment for the user. In S1004, the CPU 301 of the print server 104 deletes the email extracted in S1003 from the hard disk 310. In this manner, in the present embodiment, the email saved in the hard disk 310 of the print server 104 in S704 of FIGS. 7A and 7B can be prevented from remaining in a saved state, which makes it possible to maintain the security of the emails.

Next, a case in which it has been determined that there is no file attached to the email received in S705 of FIGS. 7A and 7B will be described with reference to FIG. 8.

In the present embodiment, there are situations where an email to which no file is attached is sent, in the case where the user replies to an error notification email. In such a case, S705 in FIGS. 7A and 7B advances to the process illustrated in FIG. 8 from "A". Although this will be described with reference to FIG. 8, the case where the user replies to an error notification email and printing is carried out properly corresponds to a process that advances from "A" to "B" in FIG. 8 through the fewest number of steps.

Figure 7B:
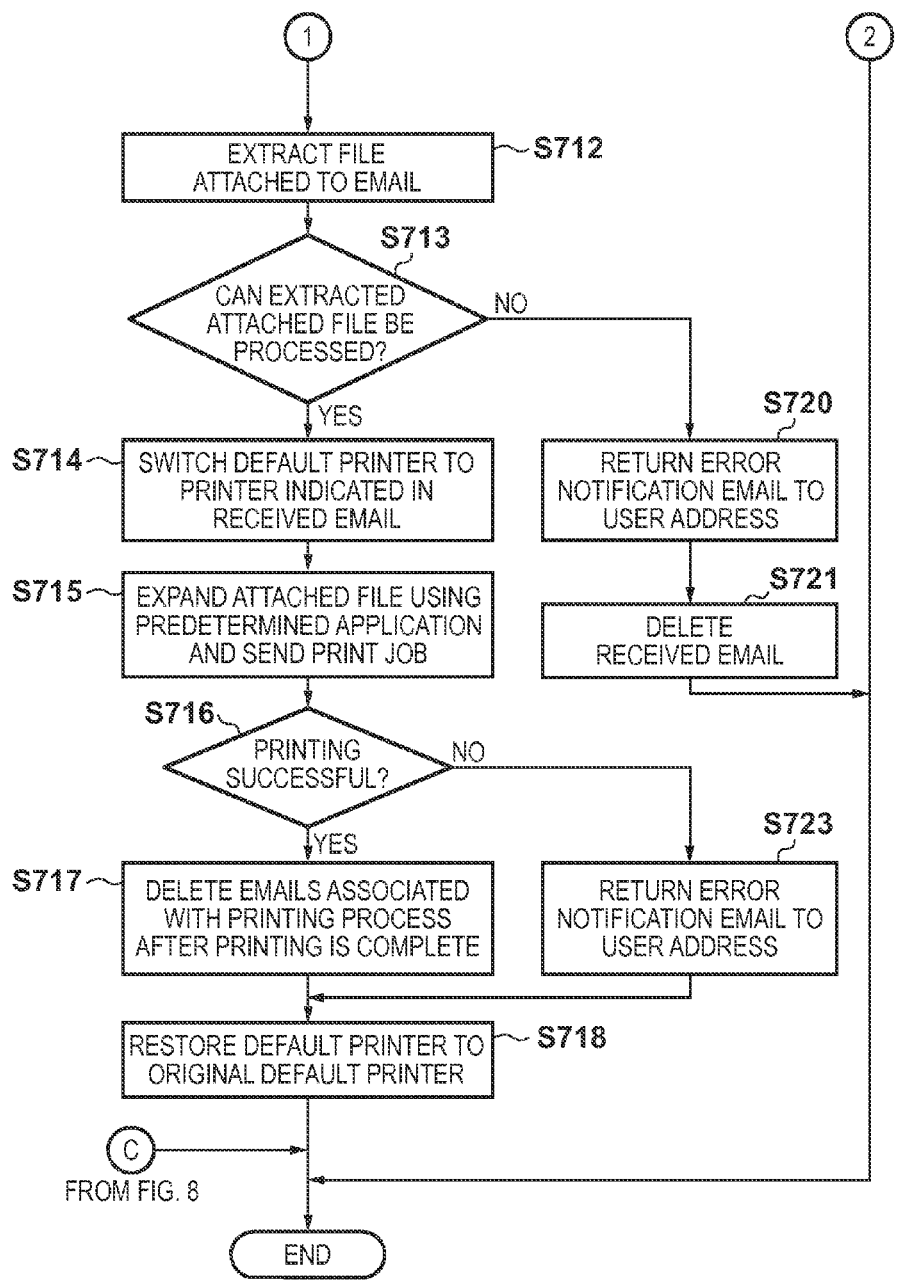
Figure 8:
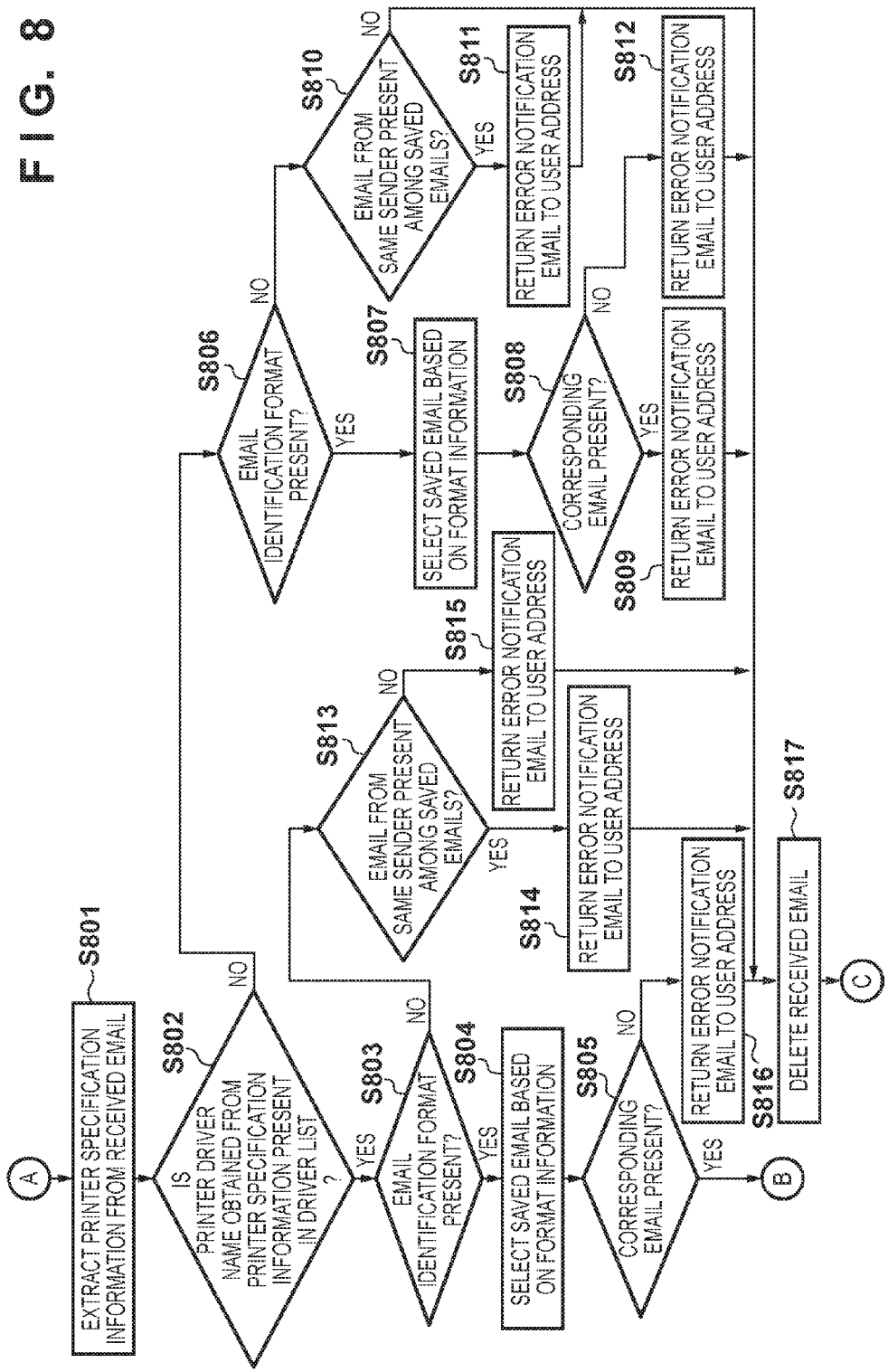
FIG. 8 is a diagram illustrating the steps of a process executed in the case where it has been determined, in S705, that there is no attached file.

In the case where it has been determined that no file is attached to the email received in S705 in FIGS. 7A and 7B, in S801 of FIG. 8, the CPU 301 of the print server 104 extracts information for specifying the printer that is to perform the printing, in the same manner as the processing of S706. In S802, the CPU 301 of the print server 104 refers to the list of the printer drivers installed in the print server 104 that is saved in the hard disk 310, in the same manner as the process of S707. The CPU 301 then determines whether or not a printer driver name obtained from the information extracted in S801 is present among the printer driver names in that list.

The procedure advances to S803 in the case where it has been determined in S802 that the printer driver name obtained from the information extracted in S801 is present in the printer driver list. In S803, the CPU 301 of the print server 104 determines whether or not an email identification format is included in the email received in S703, in the same manner as the process of S708. Here, the procedure advances to S804 in the case where it has been determined that the email identification format is included, whereas the procedure advances to S813 in the case where it has been determined that the email identification format is not included. In S804, the CPU 301 of the print server 104 selects, from among the emails saved in the hard disk 310 of the print server 104, an email that is associated with the email identification format included in the aforementioned email, in the same manner as the process of S709.

Figure 13:
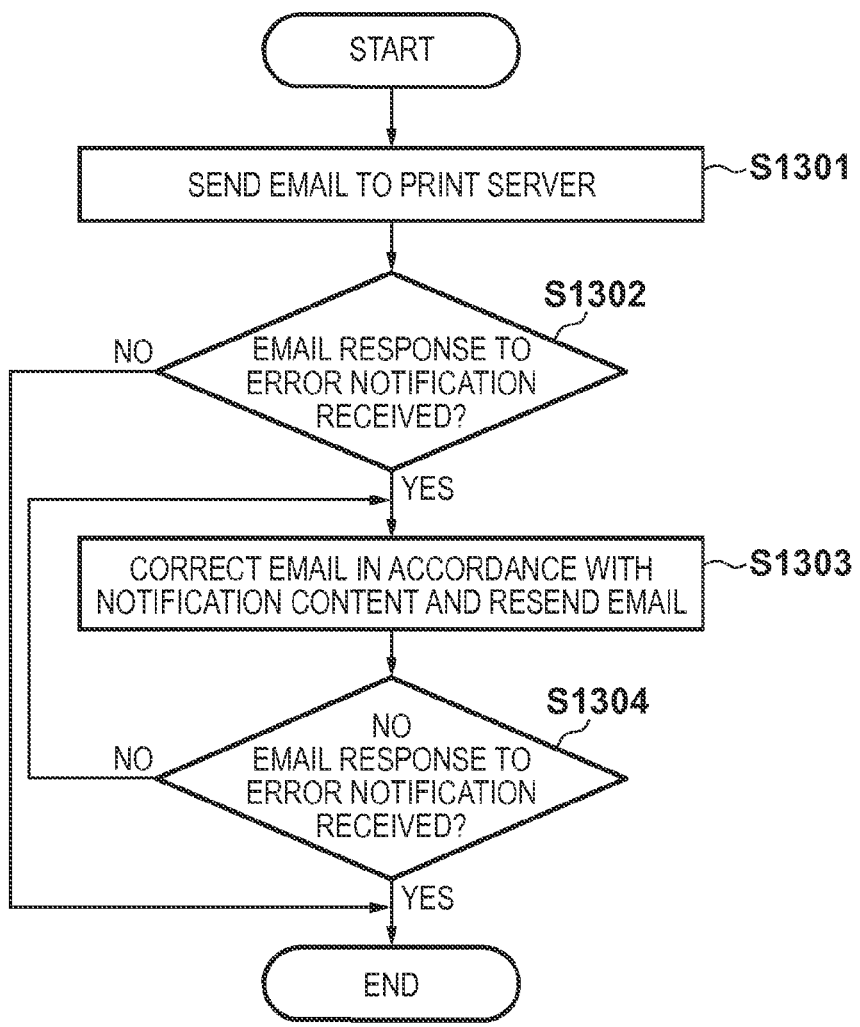
FIG. 13 is a diagram illustrating the steps of a process performed in a mobile terminal device.

In S805, the CPU 301 of the print server 104 determines whether or not there is an email that is associated with the email identification format, in the same manner as the process of S710. Here, in the case where it has been determined that there are no associated emails, the procedure advances to S816. However, in the case where it is determined that there is an associated email, the procedure advances to "B" in FIGS. 7A and 7B. The processes of S801 to S805 correspond to a case where the print server 104 has returned an error notification email in response to an error in the email sent by the user from the mobile terminal device 101 and the print server 104 has re-received the email after the user has once again requested printing. FIG. 13 is a flowchart illustrating an example of the processing performed in the mobile terminal device 101 in such a case. Details will be given later.

Hereinafter, a process performed in the case where an email has once again been received from the user after returning an error notification email to the mobile terminal device 101, but yet another error has occurred, will be described. In the case where there is no email associated with the email identification format in S805, the procedure advances to S816, and an email is returned to the user in order to notify the user that there was an error in the user's operation of the mobile terminal device 101.

An example of the error notification displayed in the email in S816 is illustrated in FIG. 9D. As shown in FIG. 9D, a message reading "an email to be printed was recently reprocessed, but because X minutes have passed, the file to be printed was deleted for security reasons" is displayed in the display unit of the mobile terminal device 101. In other words, although the user has resent an email after receiving an error notification email, the associated email has already been deleted from the hard disk 310 as a result of the process illustrated in FIG. 10. This corresponds to, for example, a case where the resending operations performed by the user in response to the error notification email are too late and the process has timed out. After the error notification email has been returned to the mobile terminal device 101 in S816, in S817, the CPU 301 of the print server 104 deletes the received email. After S817, the procedure advances to "C" in FIGS. 7A and 7B (that is, the process ends).

The procedure advances to S813 in the case where it has been determined in S803 that the email identification format is not included. In S813, the CPU 301 of the print server 104 determines whether or not the hard disk 310 contains an email from the same sender as the email received in S703. In the case where it has been determined in S813 that there is an email from the same sender, the procedure advances to S814. An example of the error notification displayed in the email in S814 is illustrated in FIG. 9E. As shown in FIG. 9E, a message reading "a quoted response for performing the print process again was not included in the email sent for printing" is displayed in the display unit of the mobile terminal device 101. This corresponds to, for example, a case where an email from the same sender as the email received in S703 is present in the hard disk 310, and thus the user did not quote the error notification email in his or her reply, resulting in the email identification format not being added. A case is also conceivable in which the current email is a new email for printing but to which the user has forgotten to attach a file, and an email, from the same sender, that was not deleted through the process illustrated in FIG. 10 for some reason and continues to be saved has been discovered. Accordingly, an instruction to add the email identification format in the case of a resend, or an instruction to attach an attached file in the case of a new print, is included in the email. After the process of S814, in S817, the CPU 301 of the print server 104 deletes the received email.

In the case where it has been determined in S813 that there is not an email from the same sender, the procedure advances to S815. An example of the error notification displayed in the email in S815 is illustrated in FIG. 9F. As shown in FIG. 9F, a message reading "a file to be printed was not attached to the email sent for printing" is displayed in the display unit of the mobile terminal device 101. This corresponds to, for example, a case in which the user forgot to attach a file when performing normal operations for sending an email from the mobile terminal device 101. Accordingly, an instruction to resend the email after attaching the attached file is written in the email. After the process of S815, in S817, the CPU 301 of the print server 104 deletes the received email.

The procedure advances to S806 in the case where it has been determined in S802 that the printer driver name obtained from the information extracted in S801 is not present in the printer driver list. The processes performed in S806, S807, and S808 are the same as the aforementioned processes in S803, S804, and S805. The procedure advances to S809 in the case where it is determined in S808 that there is an email associated with the email identification format. An example of the error notification displayed in the email in S809 is illustrated in FIG. 9G. As shown in FIG. 9G, a message reading "there was another error in the printer specified in the email sent for printing" is displayed in the display unit of the mobile terminal device 101. This corresponds to, for example, a case in which the user received an error notification email indicating that there was an error in the printer specification and resent an email specifying the printer once again, but there was once again an error in the specification of the printer. Accordingly, a notification that there was another error in the specification of the printer is written in the email, and the printer driver names in the list of printer drivers installed in the print server 104 that is saved in the hard disk 310 are attached to the email. The same email identification format is also added to the email that is returned to the user in S809. After the process of S809, in S817, the CPU 301 of the print server 104 deletes the received email.

The procedure advances to S812 in the case where it is determined in S808 that there is not an email associated with the email identification format. An example of the error notification displayed in the email in S812 is illustrated in FIG. 9H. As shown in FIG. 9H, a message reading "an email to be printed was recently reprocessed, but because X minutes have passed, the file to be printed was deleted for security reasons" is displayed in the display unit of the mobile terminal device 101. In other words, although the user has resent an email after receiving an error notification email, the associated email has already been deleted from the hard disk 310 as a result of the process illustrated in FIG. 10. In addition, because it has been determined in S802 that the printer driver name specified by the user is not present among the printer driver names in the list, the printer driver names in the list are also added to the email. Furthermore, because it has been determined that there is no email associated with the email identification format, an email identification format is not added to the error notification email returned to the user in S812. After the process of S812, in S817, the CPU 301 of the print server 104 deletes the received email.

Figure 9I:
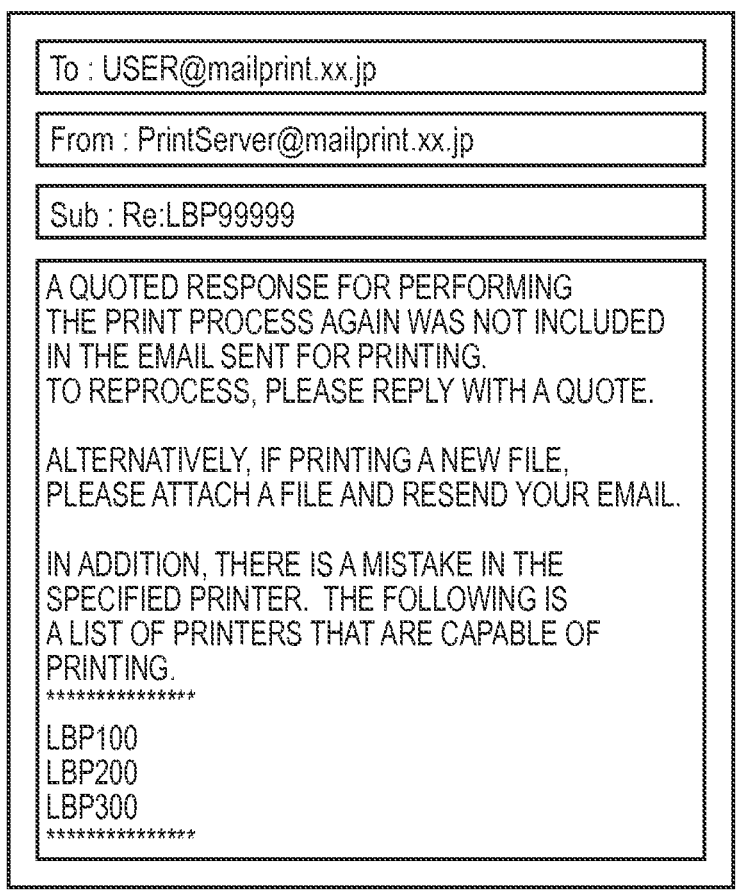

The procedure advances to S810 in the case where it has been determined in S806 that the email identification format is not included. In S810, the CPU 301 of the print server 104 determines whether or not the hard disk 310 contains an email from the same sender as the email received in S703, in the same manner as the process of S813. In the case where it has been determined in S810 that there is an email from the same sender, the procedure advances to S811. An example of the error notification displayed in the email in S811 is illustrated in FIG. 9I. As shown in FIG. 9I, a message reading "a quoted response for performing the print process again was not included in the email sent for printing" is displayed in the display unit of the mobile terminal device 101. This corresponds to, for example, a case where an email from the same sender as the email received in S703 is present in the hard disk 310, and thus the user did not quote the error notification email in his or her reply, resulting in the email identification format not being added. A case is also conceivable in which, because there is no email identification format, no printer driver name specification, and no attached file, the current email is a new email for printing but to which the user has forgotten to attach a file, and an email, from the same sender, that was not deleted through the process illustrated in FIG. 10 for some reason and continues to be saved has been discovered. Accordingly, an instruction to add the email identification format in the case of a resend, or an instruction to attach an attached file in the case of a new print, is included in the email. In addition, the printer driver names in the list are also added to the email. After the process of S811, in S817, the CPU 301 of the print server 104 deletes the received email.

In the case where it has been determined in S810 that the hard disk 310 does not contain an email from the same sender as the email received in S703, all normally conceivable errors are included, and thus an error notification is not made via email. In the case where such a determination result is made in S810, it is conceivable that the user forgot to specify an email identification format and a printer driver name, and that the saved email has been deleted; however, such a situation is extremely rare, and thus error notification processing using email is not carried out. However, in the present embodiment, an email in which an error notification suited to such a situation is written may be returned to the user. After the process of S810, in S817, the CPU 301 of the print server 104 deletes the received email.

Next, operations of the mobile terminal device 101 performed by the user who wishes to print via email when the processes indicated in FIGS. 7A, 7B and 8 are being carried out will be described with reference to FIG. 13. In S1301, the CPU of the mobile terminal device 101 sends an email to the print server 104 through email software in response to user operations. The email sent at this time is an email that the user wishes to print via email, and is thus an email to which a file to be printed is attached and in the subject field of which the printer driver name is specified.

However, in the case where, for example, the email sent from the mobile terminal device 101 by the user is not compliant with a mobile-connected printing system, in S1302, an error notification email is received from the print server 104. This error notification is, for example, the error notification shown in FIG. 9A.

In S1302, the CPU of the mobile terminal device 101 determines whether or not an error notification email has been received from the print server 104. Here, in the case where it has been determined that the error notification email has not been received, the process illustrated in FIG. 13 ends. In other words, the email printing has succeeded. The configuration may be such that in this case, an email notifying the user of the success is returned from the print server 104.

However, in the case where it is determined in S1302 that an error notification email has been received from the print server 104, the procedure advances to S1303. In S1303, the user resends the email in accordance with the various types of error notifications, shown in FIGS. 9A through 9I, that are displayed in the email received by the mobile terminal device 101 from the print server 104. Here, in the case where, for example, the email resent from the mobile terminal device 101 by the user is not compliant with a mobile-connected printing system, an error notification email is once again received from the print server 104. Accordingly, in S1304, the CPU of the mobile terminal device 101 determines whether or not an error notification email has been received. In the case where it has been determined in S1304 that the error notification email has not been received, the process illustrated in FIG. 13 ends. In other words, the email printing has succeeded after the user resent the email, or in other words, after the user re-requested the print. The configuration may be such that in this case, an email notifying the user of the success may be returned from the print server 104.

As described thus far, when executing email printing via an email, the email printing can be re-executed as appropriate in accordance with an instruction from the print server 104, even in a case where the user has, for example, forgotten to specify the printing.

In the present embodiment, as shown in FIGS. 7A, 7B and 8, there is no need to add special configurations to the printer. In the case where the user has made an error when attempting to perform mobile-connected printing (email printing) by sending an email, various types of error notifications, as illustrated in FIGS. 9A to 9I, are sent to the mobile terminal device 101. As a result, the user can be made aware of his or her operational mistakes and be instructed as to the next process to be performed via email, which makes it easy for the user to understand what action he or she can take to avoid an error. Furthermore, in the present embodiment, the processing illustrated in FIG. 10 makes it possible to increase security by deleting, after a given time limit, emails that have been automatically saved in S704 of FIGS. 7A, 7B and 8 so that the files attached thereto can be reused.

Note that in the present embodiment, the "printer driver name inputted into the subject" is the information to be extracted from the received email. However, the printer driver name is simply one given type of information, and generally a product name is often used. Inputting all of these items into the subject field is burdensome, and a case in which the printer driver name has been changed is also conceivable. Accordingly, the specified printer driver names may be defined by a table such as that shown in FIG. 12, and the printer driver names and specified names (for example, abbreviated printer names) may be associated with each other. According to such a configuration, the user can specify the printer without specifying a long printer driver name, and will not be affected even in the case where the printer driver name has been changed. Using such a table also makes it possible to output a file to the default printer without returning an error in the case where there is no subject. In the case where a new printer has been connected to the wired LAN 106 illustrated in FIG. 1, connected to the local interface of the print server 104, or the like, the CPU 301 of the print server 104 may add information of the printer driver and the printer name to the table illustrated in FIG. 12.

Although the printer 105 is directly connected to the wired LAN 106 in the present embodiment, a printer provided only with a local interface may be connected to the LIC 307 of the print server 104 using, for example, a USB cable. Even with such a configuration, the port setting for the printer driver is a USB port, and thus the operations of the present embodiment can be realized. In addition, the wired LAN 106 shown in FIG. 1 may be replaced with wireless communication, communication over the Internet, or the like.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-059102, filed Mar. 15, 2012, which is hereby incorporated by reference herein in its entirety.

What is claimed is:

1. An information processing apparatus comprising:
a receiving unit configured to receive, from an email server, an email requesting an attached file to be printed;
a storing unit configured to store a flow which defines a sequence of a plurality of error determination processes for determining a plurality of error types indicating that printing conditions for printing the attached file are not met before the attached file is printed;
a sequence determining unit configured to determine whether to perform the sequence;
a flow controlling unit configured to, in a case where the sequence determining unit determines to perform the sequence and a result of an error determination process of the plurality of error determination processes indicates no error, control the flow to proceed to a next error determination process subsequent to the error determination process; and
a sending unit configured to, in a case where the result of the error determination process of the plurality of error determination processes indicates an error, send an error notification corresponding to an error type of the error determination process to the email server as a reply to the email received by the receiving unit,
wherein in a case where the sequence determining unit determines not to perform the sequence, said flow controlling unit skips the sequence.

2. The information processing apparatus according to claim 1,
wherein the sending unit sends, to the email server, an email including the error notification and a description of a method for recovering the error and proceeding with the flow.

3. The information processing apparatus according to claim 2,
wherein the result of the error determination process indicates the error in a case where a printer specified in the email received by the receiving unit is not a printer that is managed by the information processing apparatus.

4. The information processing apparatus according to claim 3,
wherein the sending unit sends the email including a list of printers managed by the information processing apparatus to proceed with the flow.

5. The information processing apparatus according to claim 2, further comprising:
a print control unit configured to cause a printer specified by the email received by the receiving unit to print the attached file of the email,
wherein the sending unit sends the error notification in a case where the printing of the attached file of the email received by the receiving unit performed by the printer is failed.

6. The information processing apparatus according to claim 2,
wherein the result of the error determination process indicates the error in a case where a file whose printing is being requested is not attached to the email received by the receiving unit.

7. The information processing apparatus according to claim 2, wherein the sending unit sends the error notification in a case where the attached file of the email received by the receiving unit is not in a format that can be processed for printing.

8. The information processing apparatus according to claim 2, further comprising:
a saving unit configured to save the email received by the receiving unit and the attached file of the email,
wherein the error notification sent by the sending unit includes an instruction to re-request a printing by replying to an email.

9. The information processing apparatus according to claim 8, further comprising:
a deleting unit configured to delete the email and the attached file, saved by the saving unit, for which a pre-set amount of time is elapsed.

10. The information processing apparatus according to claim 1, wherein the flow includes a plurality of sub-flows corresponding to errors, and
in a case where the result of the error determination process indicates the error, the flow controlling unit proceeds with a sub-flow corresponding to the error, of the plurality of sub-flows.

11. The information processing apparatus according to claim 10, wherein in a case where the error is recovered, the flow controlling unit controls the flow to proceed to a next sub-flow.

12. A printing system comprising:
an information processing apparatus including
a receiving unit configured to receive, from an email server, an email requesting an attached file to be printed,
a storing unit configured to store a flow which defines a sequence of a plurality of error determination processes for determining a plurality of error types indicating that printing conditions for printing the attached file are not met before the attached file is printed;
a sequence determining unit configured to determine whether to perform the sequence;
a flow controlling unit configured to, in a case where the sequence determining unit determines to perform the sequence and a result of an error determination process of the plurality of error determination processes indicates no error, control the flow to proceed to a next error determination process subsequent to the error determination process; and
a sending unit configured to, in a case where the result of the error determination process of the plurality of error determination processes indicates an error, send an error notification corresponding to an error type of the error determination process to the email server as a reply to the email received by the receiving unit;
wherein in a case where the sequence determining unit determines not to perform the sequence, said flow controlling unit skips the sequence,
a mobile terminal configured to send the email requesting the attached file to be printed to the email server; and
a printer configured to print the attached file.

13. An error notification method executed by an information processing apparatus, the method including:
a receiving step of receiving, from an email server, an email requesting an attached file to be printed;
a flow controlling step of controlling a flow stored in a storing unit configured to store the flow which defines a sequence of a plurality of error determination processes for determining a plurality of error types indicating that printing conditions for printing the attached file are not met before the attached file is printed;
a sequence determining step of determining whether to perform the sequence;
wherein, in a case where the sequence determining step determines to perform the sequence and a result of an error determination process of the plurality of error determination processes indicates no error, the flow is controlled to proceed to a next error determination process subsequent to the error determination process; and
a sending step of, in a case where the result of the error determination process of the plurality of error determination processes indicates an error, sending an error notification corresponding to an error type of the error determination process, to the email server as a reply to the email received in the receiving step,
wherein, in a case where the sequence determining step determines not to perform the sequence, said flow controlling step skips the sequence.

14. A non-transitory computer-readable storage medium in which is stored a program that causes a computer to execute:
a receiving step of receiving, from an email server, an email requesting an attached file to be printed;
a flow controlling step of controlling a flow stored in a storing unit configured to store the flow which defines a sequence of a plurality of error determination processes for determining a plurality of error types indicating that printing conditions for printing the attached file are not met before the attached file is printed,
a sequence determining step of determining whether to perform the sequence;
wherein, in a case where the sequence determining step determines to perform the sequence and a result of an error determination process of the plurality of error determination processes indicates no error, the flow is controlled to proceed to a next error determination process subsequent to the error determination process; and
a sending step of, in a case where the result of the error determination process of the plurality of error determination processes indicates an error, sending an error notification corresponding to an error type of the error determination process, to the email server as a reply to the email received in the receiving step,
wherein, in a case where the sequence determining step determines not to perform the sequence, said flow controlling step skips the sequence.

15. An information processing apparatus which is able to communicate with a printing apparatus, the information processing apparatus comprising:
a receiving unit configured to receive an email to which a file is attached, wherein the email includes information indicating a printing apparatus for executing printing of the file;
a storing unit configured to store a flow which defines a sequence of a plurality of error determination processes for determining a plurality of error types indicating that printing conditions for printing the attached file are not met before the attached file is printed;
a sequence determining unit configured to determine whether to perform the sequence
a flow controlling unit configured to, in a case where the sequence determining unit determines to perform the sequence and a result of an error determination process of the plurality of error determination processes indicates no error, control the flow to proceed to a next error determination process subsequent to the error determination process; and
a sending unit configured to, in a case where the result of the error determination process of the plurality of error determination processes indicates an error that the printing apparatus is not usable by the information processing apparatus, send an email corresponding to an error type of the error determination process, to a source of the received email, wherein the email includes information indicating that printing of the file is not finished, wherein in a case where the sequence determining unit determines not to perform the sequence, said flow controlling unit skips the sequence.

16. The apparatus according to claim 15, wherein the result of the error determination process of the plurality of error determination processes indicates the error that the printing apparatus indicated by the information is not usable by the information processing apparatus, in a case where the printing apparatus indicated by the information is not managed by the information processing apparatus.

17. The apparatus according to claim 16, wherein the email sent by the sending unit includes a list of printing apparatuses managed by the information processing apparatus.

18. The apparatus according to claim 15, wherein the sending unit sends the email in a return mail format to the source of the received email.

19. The apparatus according to claim 15, further comprising:

a holding unit configured to hold the file attached to the received email received by the receiving unit;

a generating unit configured to generate print data for printing based on the file held by the holding unit, in a case where the receiving unit receives the email in a return mail format to the sent email sent by the sending unit.

20. The apparatus according to claim 15, wherein the information indicating the printing apparatus for executing the printing of the file is described in a subject title of the email.

21. The apparatus according to claim 15, wherein the information indicating the printing apparatus for executing the printing of the file is a name of the printing apparatus.

22. The information processing apparatus according to claim 15, wherein the flow includes a plurality of sub-flows corresponding to errors, and in a case where the result of the error determination process indicates the error, the flow controlling unit proceeds with a sub-flow corresponding to the error, of the plurality of sub-flows.

23. The information processing apparatus according to claim 22, wherein in a case where the error is recovered, the flow controlling unit controls the flow to proceed to a next sub-flow.

\* \* \* \* \*